June 26, 1923. 1,460,070
H. MAIMIN
MOTOR DRIVE FOR SEWING MACHINES
Filed Dec. 29, 1919  2 Sheets-Sheet 1
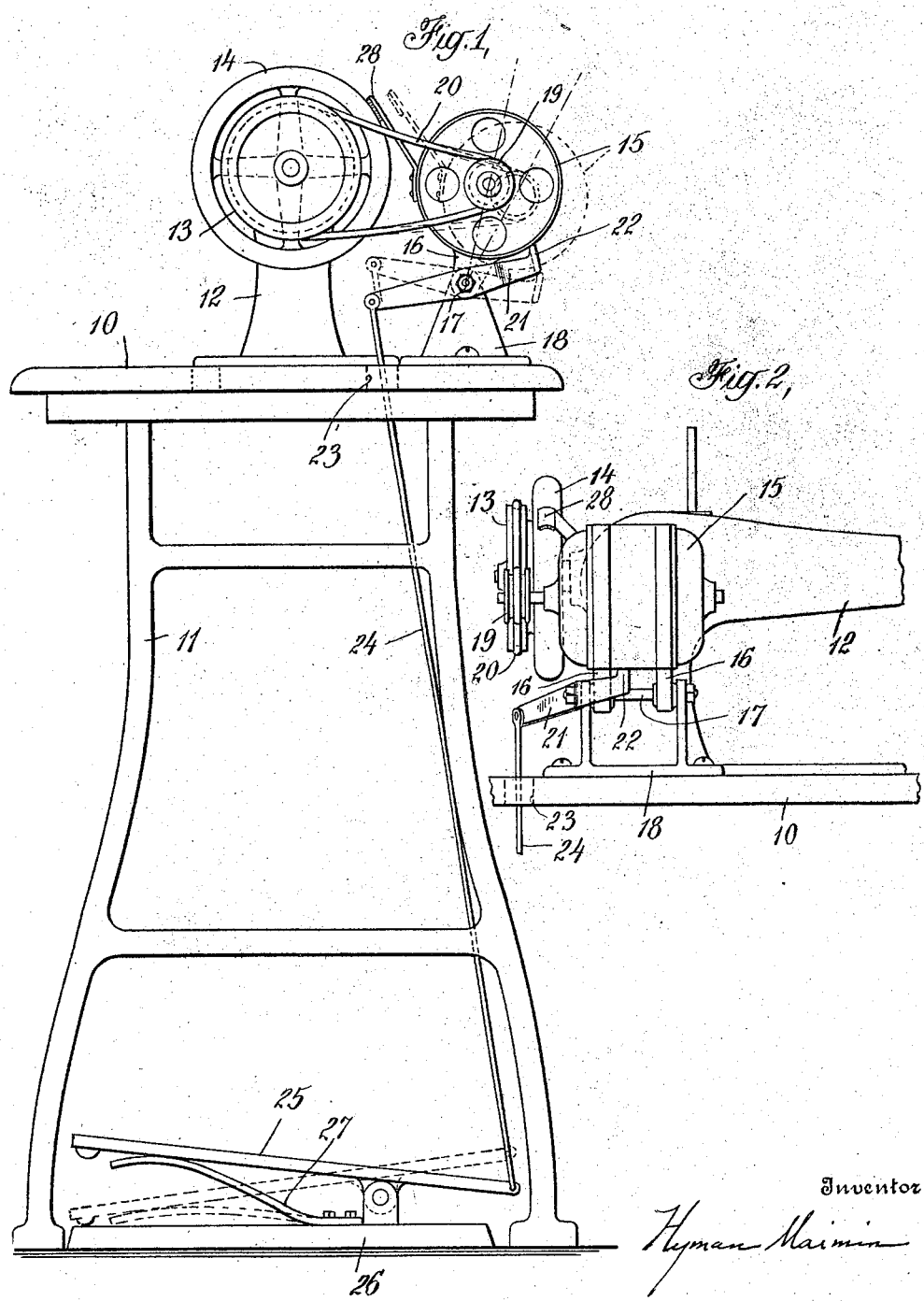

June 26, 1923.
H. MAIMIN
MOTOR DRIVE FOR SEWING MACHINES
Filed Dec. 29, 1919
1,460,070
2 Sheets-Sheet 2
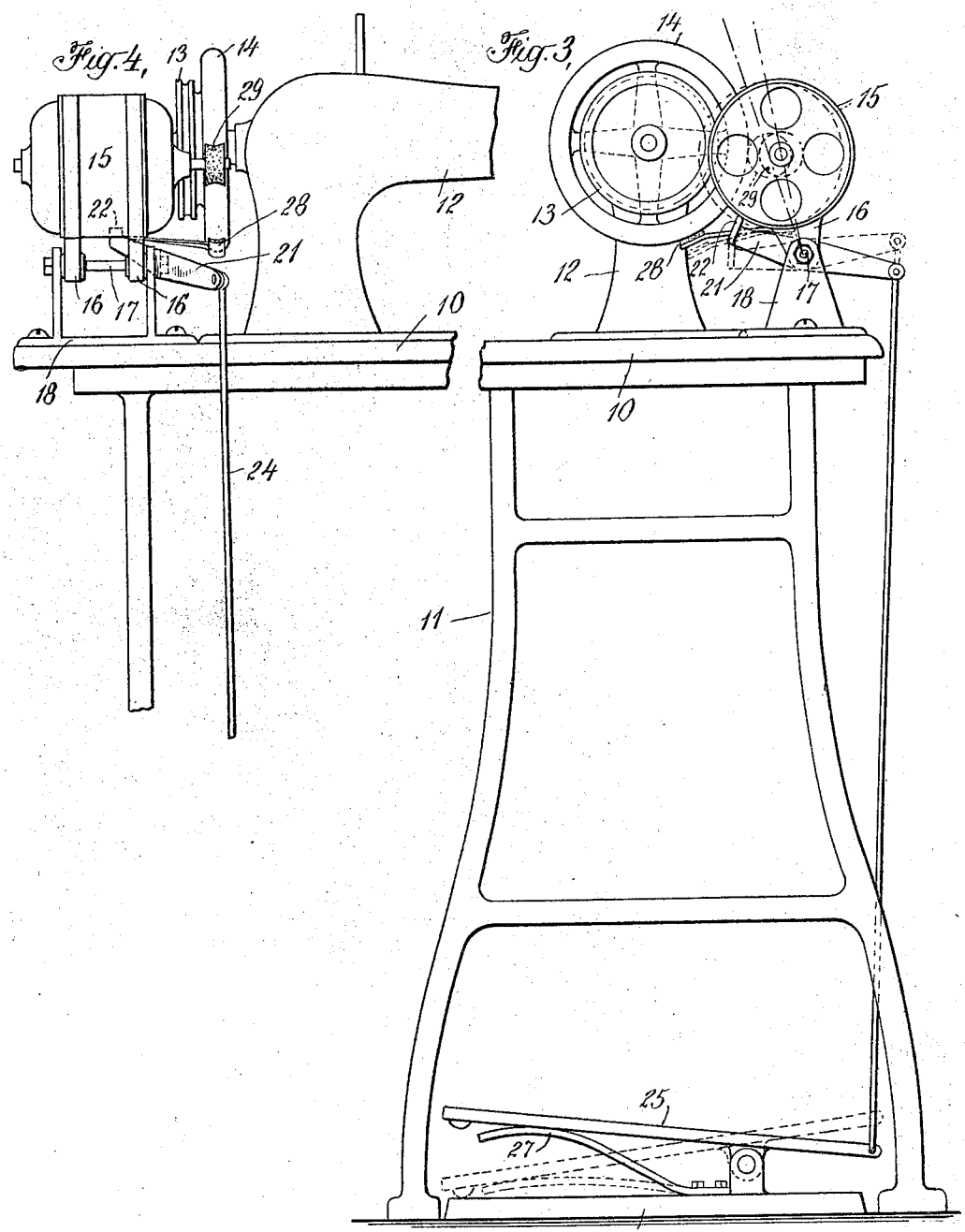
Inventor
Hyman Maimin
By Pennie, Davis, Marvin & Edmonds
Attorneys Patented June 26, 1923.

1,460,070

UNITED STATES PATENT OFFICE.

HYMAN MAIMIN, OF NEW YORK, N. Y.

MOTOR DRIVE FOR SEWING MACHINES.

Application filed December 29, 1919. Serial No. 348,027.

*To all whom it may concern:*

Be it known that I, HYMAN MAIMIN, a citizen of the United States, residing at New York city, in the county of New York, State of New York, have invented certain new and useful Improvements in Motor Drives for Sewing Machines; and I do hereby declare the following to be a full, clear, and exact description of the invention, such as will enable others skilled in the art to which it appertains to make and use the same.

This invention relates to motor drives for sewing machines.

Small electric motors are now generally used for driving sewing machines, especially in the case of machines that are to be run continuously, as in the garment industry. In accordance with the usual practice rheostats are used in connection with the motors to prevent sudden rushes of current when the motors are started under load and also to permit the speed of the machines to be controlled while they are in operation. The price of a suitable rheostat is a substantial part of the total cost of an equipment, and this piece of apparatus is the source of most of the troubles that arise in connection with motor drives for sewing machines. The recognition of the disadvantages of rheostats has led to the production of many arrangements for dispensing with them, such arrangements being in general based upon the employment of continuously driven motors which are arranged to be brought into operative relation to the machines whenever it is desired that the latter be driven. In some of these prior arrangements the motors occupy fixed relations to the machines with which they are associated and are connected by belts to friction wheels which are adapted to be swung into engagement with the hand wheels of the machines to drive the latter. These arrangements, however, require the use of extra members, and in some cases there are changes in the tension of the driving belts, due to the movement of the swinging members upon which the friction wheels are carried. To avoid the use of separate driving members, arrangements have been proposed in which the motors are movably mounted with respect to the machines which they are to drive, and by means of suitable actuating mechanisms the motors may be moved bodily to bring friction wheels mounted on their shafts into engagement with the hand wheels of the machines. These last named arrangements possess the disadvantage that the speeds at which the machines are driven from the motors depend upon the pressures with which the friction wheels of the motors are held against the hand wheels of the machines. In these arrangements the motors are moved by mechanisms adapted to be actuated by the feet or knees of the operators and are therefore subject to considerable variations on account of changes in the force exerted by the operators. In power drives for sewing machines, particularly in the garment industry, the machines should be arranged so that they may be normally operated at predetermined speeds to which the operators are required to conform in the performance of their part of the work. In prior arrangements for eliminating the use of rheostats, such as referred to above, the fact that the speed of the machines is directly under the control of the operators and depends upon the effort expended by them in holding the motors in operative relation to the machines, makes it comparatively easy for a slow operator to prevent his machines from being driven at the required speed, with the result that his production will be cut down and the motor will not be operated at its full load.

It has been proposed to mount such motors pivotally adjacent the hand wheels or driving pulleys of the sewing machines in such a manner that they may be thrown into or withdrawn from operative relation to the machines by tilting them about their pivots. Such an arrangement provides that the speeds at which the machines shall be driven by the motors will under normal conditions be of predetermined amounts and will not be as subject to variations in the efforts expended by the operators as are prior arrangements of this general character. The arrangement does, however, permit the operator to change the speed of the machine from time to time as may be required, but this alteration necessitates a special act on his part which will not naturally be performed under normal conditions of operation. Power may be transmitted from the motors to the machines by means of friction pulleys on the shafts of the motors which are brought into engagement with the hand wheels of the machines by allowing the motors to fall toward the machines, or pulleys on the shafts of the motors may be connected by belts to pulleys on the shafts of the machines, in which case the motors will be arranged to fall away from the machines to apply tension to the belts.

For most convenient operation the positions of the motors are controlled by treadles in order that the hands of the operators may be free for manipulating their work. In the particular embodiments of the invention shown in my copending application the treadles are connected directly to the motors by means of flexible members and are actuated by springs in such a manner as normally to swing the motors so that their friction pulleys are disengaged from the hand wheels of the machines or the driving belts are slackened, as the case may be. When the effect of the springs is overcome by pressure upon the treadles the motors will fall into position to transmit power to the machines, and the arrangements are such that the normal movement imparted to the treadles will be sufficient to slacken the flexible connections so that the motors will be held in operative relation to the wheels of the machines by their own weight independently of any effect of the treadle springs. The flexible connections shown in my copending application consist of cords, chains or the like, which are connected directly to the motors by means of lugs on their casings. Furthermore, since the motors are located above the tables of the machines while the treadles are below the same, it is necessary to pass the flexible connections through apertures in the tables of the machines. The tables of sewing machines are ordinarily provided with holes to permit the passage of driving belts for use when the machines are not driven by motors, these belts passing over fly wheels connected to treadles below the tables. The holes must be located directly beneath the driving pulleys of the machines and ordinarily will not be in the right position to be used as passageways for the flexible connections forming part of the motor drive arrangements of my copending application, so that it is necessary to bore special holes in the tables of the machines when the invention is applied thereto. Flexible connections such as shown in my copending application are liable to stretch in usage and produce alterations in the adjustment of the parts of the apparatus. It may therefore be desirable in some cases to employ a rigid actuating connection, but in order that the arrangement may be such as to permit the motor to be held in operative relation to the machine by its own weight independently of the effect of the treadle spring under normal conditions of operation, it is necessary to provide for a certain amount of lost-motion in this connection.

In accordance with the present invention this lost-motion connection is obtained by means of a lever mounted to swing about a pivot coinciding with the pivotal axis of the motor and one end of which is adapted to be brought into engagement with the motor to move the latter when the lever is swung in one direction by means of a connection between the other end of the lever and the treadle of the machine. This end of the lever may be arranged so that the connection may pass through one of the usual belt holes in the table of the machine, or outside of the table according to whether a belt drive or a friction drive is used. The relation of the parts is such that when the treadle is completely depressed the lever will exert no lifting effect upon the motor so that the latter will be held in operative relation to the machine by its weight independently of any effect of the treadle spring. The arrangement does, however, permit the operator to exercise a certain amount of control over the speed of his machine, for, if the treadle is not pressed downwardly to its full extent, the lever will be held in engagement with the motor and balance the weight of the latter so that the pressure with which its friction pulley is held against the hand wheel of the machine will be lessened, or in case a belt drive is employed, the effect of the weight of the motor in producing belt tension will be partly overcome. In either case there will be some slip in the driving connections which will result in decreased speed of the machine. The natural condition of operation wil be such that the operator will find it most convenient to hold the treadle completely depressed so as to release the lever sufficiently to free the motor and permit it to be held in operative relation with the machine by its own weight. It will be somewhat more tedious for the operator to hold the treadle in partially depressed condition to produce a slower speed of the machine.

It has been proposed to mount the motor upon the end of a bracket attached to the frame of the machine but in the case of certain types of sewing machines, particularly those adapted to be used for buttonhole or embroidery work, there is so much mechanism mounted upon both sides of the frames of the machines that brackets cannot conveniently be employed. It is therefore necessary to provide some other arrangement for mounting the motor. In accordance with the invention of this application the motor is mounted upon a pedestal adapted to be attached to the table of the machine in proper position with respect to the hand wheel and driving pulley of the machine to bring the motor into operative relation to these parts. In case the motor is arranged to drive the machine by means of a friction pulley, it is necessary that the motor fall toward the machine, when the latter is to be driven, while in the case of a belt drive it is necessary that the motor fall away from the machine. So far as the treadle is concerned, it is most convenient to arrange it so that it must be depressed to release the motor to permit it to fall into operative relation to the machine, and it is therefore necessary that the lost motion connection be attached to one or the other side of the motor, according to the form of drive to be employed. In order that the apparatus shall possess the greatest utility, the present invention provides an arrangement whereby the motor may be used for either one or the other mode of drive, simply by reversing its position with respect to the table of the machine, and the treadle connection may remain attached to the lost-motion lever connection and be passed through one of the usual belt holes in the top of the table or pass outside of the table according to the position of the lever.

With any arrangement in which the motor is entirely disconnected from the machine when it is desired to stop the latter, the momentum of the moving parts of the machine will cause it to run after the motor has been disconnected therefrom. It may, therefore, be desirable to employ a brake which shall become effective when the motor is taken out of operative relation to the machine.

In accordance with this invention the brake is attached to the motor in such a manner that it will be brought into engagement with the hand wheel of the machine when the motor is swung by the spring-actuated treadle to lift its friction wheel from contact with the machine wheel or slacken the driving belt, according to the form of drive employed.

Since with the preferred arrangement of either form of drive the motor is mounted above its pivot, a sudden release of the treadle might cause the spring to throw the motor over to the wrong side of its pivot, in which case it would not fall into operative relation to the machine upon a subsequent actuation of the treadle. It is therefore advisable to provide means for preventing any overthrow of the motor. For this purpose I make use of the brake associated with the motor, and arrange the parts so that when the brake is in engagement with the hand wheel of the machine it acts as a stop to limit the movement of the motor and prevent it from being thrown over to the wrong side of its pivot.

The particular nature of the invention, as well as other objects and advantages thereof, will appear more clearly from a description of certain preferred embodiments as illustrated in the accompanying drawings, in which:—

Fig. 1 is an end elevation of a sewing machine provided with a motor arranged for a belt drive;

Fig. 2 is a side elevation of the apparatus of Fig. 1;

Fig. 3 is an end elevation of a sewing machine with the motor arranged for a friction drive; and Fig. 4 is a side elevation of the arrangement of Fig. 3.

The sewing machine illustrated somewhat diagrammatically in the drawings comprises a table 10 carried upon standards 11 and serving as a support for the frame 12 which consists of a vertical portion and a horizontal portion carrying at its outer end the usual casing within which the mechanism for reciprocating the needle is mounted, this mechanism being driven by a shaft carrying a belt pulley 13 and hand wheel 14. An electric motor 15 is provided for driving the machine. The motor is provided with lugs 16 adapted to receive a pin 17 supported between the uprights of a pedestal 18 which may be attached to the top of the table 10 in position to bring the motor in proper relation to the machine.

In the embodiment of the invention shown in Figs 1 and 2 the shaft of the motor is provided with a pulley 19 which is connected to the pulley 13 of the machine by a belt 20. With this arrangement the motor must fall away from the machine to tighten the belt so that power may be transmitted from the motor to the machine.

For the purpose of controlling the position of the motor there is provided a lever 21 preferably mounted upon the pin 17 outside of one of the standards of the pedestal. One arm of the lever is bent inwardly and provided with a projection 22 adapted to engage the motor between the lugs 16. The other arm of the lever is extended and bent so that its outer end lies above one of the usual belt holes 23 in the table of the machine. A rod 24 passing through the belt hole is attached at one end to the inner end of the lever, and the other end of the rod is connected to a treadle 25 mounted upon a base 26 which may be placed in convenient position to be reached by the operator's foot. Beneath the treadle is a spring 27 which normally raises the treadle into the position shown in Fig. 1. The arms of the lever 21 and of the treadle 26 should be so proportioned that when the treadle is depressed to its maximum extent as indicated in broken lines in Fig. 1, the motor 15 will fall into the correspondingly indicated position and tighten the belt 20 sufficiently to permit power to be transmitted from the motor to the machine. After the motor has swung away from the machine as far as it will be permitted to do by the belt, additional movement should preferably be imparted to the lever 21 so that it may swing free of the motor as indicated in broken lines in Fig. 1. Under these conditions the motor will be independent of the lever, and the belt tension produced by the weight of the motor will not be lessened by any opposing effect of the treadle spring 27.

The motor will thus drive the machine at the predetermined speed regarded as suitable for most efficient operation. In case it is desired to lessen the speed of the machine the treadle 25 will be lifted sufficiently to swing the lever 21 into engagement with the motor and thereafter lift the motor slightly to partially overcome the effect of the weight of the motor upon the tension of the belt. As a result of the lessened belt tension, there will be produced between it and the pulleys to which it is connected a certain amount of slip which will cause a decreased speed of operation of the machine without changing the speed of the motor by means of a rheostat or similar device.

When the treadle is released to permit the spring 27 to swing the motor toward the machine, the latter will continue to run on account of the momentum of its moving parts. In order that its speed may be checked quickly, a brake 28, preferably consisting of spring metal provided at its free end with a pad of friction material, may be attached to the motor in such a position that it will engage the hand wheel 14 when the belt becomes so slack that no power will be transmitted to the machine. The parts should also be so arranged that the brake will engage the hand wheel before the motor reaches the highest point of its path, in order that the brake may act as a stop to prevent the motor from being thrown over its pivot, in which case it would fall onto the machine and be rendered inoperative in its intended manner. By forming the brake of spring metal it will yield slightly when brought into engagement with the hand wheel so as to prevent sudden shocks upon the motor and the moving parts of the machine.

In the embodiment of the invention shown in Figs. 3 and 4 the shaft of the motor is provided with a friction pulley 29 which may be brought into engagement with the hand wheel 14 to drive the machine, by allowing the motor to fall toward the machine. The movement thus required to be imparted to the motor by depression of the treadle 25 will be opposite to that required when a belt drive is employed. The apparatus is so constructed that it may be used for a friction drive by placing the pedestal 18 upon the table in a reversed position with the friction pulley 29 in position to engage the hand-wheel of the machine when the motor falls toward the latter.

The parts of the apparatus should preferably be so arranged and proportioned that the end of the lever 21 to which the rod 24 is connected extends beyond the table of the machine so that the rod clears the table, and it is not necessary to provide a special hole or slot to accommodate the rod.

When the motor is arranged for a friction drive, complete depression of the treadle into the broken line position of Fig. 3 will permit the motor to fall into engagement with the hand wheel of the machine, and as in the case of the belt drive arrangement, the lever 21 should preferably be swung out of engagement with the motor, so that the friction pulley 29 will be held in engagement with the hand wheel of the machine by the weight of the motor unaffected by the treadle spring 27. Under these conditions the motor will drive the machine at the predetermined maximum speed so long as the treadle is held in completely depressed position. By releasing the treadle, however, its spring may be permitted to exert some effect in overcoming the weight of the motor by lifting the latter by means of the lever 21 so that slip may occur between the friction pulley of the motor and the hand wheel of the machine with resultant decrease in the speed of the latter.

With the friction drive arrangement of Figs. 3 and 4, the brake 28 will be arranged so that it will engage the hand wheel of the machine as the motor swings away from the latter, and will also act as a stop to limit the outward movement of the motor and prevent it from being thrown over its pivot into a position in which it could not subsequently fall into engagement with the hand wheel.

The invention thus provides an arrangement for holding motors in operative relation to sewing machines, which is particularly adapted for use in connection with machines in which the frames carry mechanism which would interfere with the use of brackets, clamps or other devices for mounting the motors upon the frames of the machines. The mechanism for controlling the position of the motors permits one to utilize the usual belt holes in the tables of the machines so that it is unnecessary to bore special holes for this purpose. The invention further provides a lost-motion arrangement which permits a rigid actuating connection to be used, thus avoiding the use of flexible members which might stretch, while at the same time permitting the machine to be driven under normal conditions at maximum speed so that the efficiency of the operator may be maintained at the required standard. It is, however, possible to produce changes in the speed of the machine by altering the position of the motor, but such changes require that the operator hold the treadle in an intermediate position which is not only less comfortable, but renders it more difficult to maintain a constant speed of the machine than when the treadle is in fully depressed condition, which is in the nature of a stop position and may be maintained by the operator with comparatively little effort. In other words, the usual condition of the machine will be either one in which the driving motor is held entirely out of operative relation to the machine by the spring acting upon the treadle, or one in which the motor is held in operative relation to the machine by its weight independently of the spring; but it is possible to produce a third condition in which the motor is held in operative relation under the balanced effect of its weight and the force exerted by the spring.

While certain preferred embodiments of the invention have been shown and described, it will be understood that various changes in the details or construction may be made without departing from the principle of the invention as defined in the appended claims.

Cross reference is hereby made under the provisions of rule 43, to copending application Serial No. 343,216, filed December 3th, 1919.

I claim:

1. In a sewing machine mounted upon a table and provided with a driving wheel, the combination of a pedestal adapted to be attached to the table of the machine, a motor mounted to swing about an axis on the pedestal and be held in operative relation to the wheel of the machine by its own weight, a lever mounted on the pedestal and formed at one end to engage the motor, and means for automatically actuating the lever to bring its end into engagement with the motor to lift the same out of operative relation to the wheel of the machine.

2. In a sewing machine mounted upon a table and provided with a driving wheel, the combination of a pedestal adapted to be attached to the table of the machine, a motor mounted to swing about an axis on the pedestal and be held in operative relation to the wheel of the machine by its own weight, a lever mounted on the pedestal and formed at one end to engage the motor, and means for automatically actuating the lever to bring its end into engagement with the motor to lift the same out of operative relation to the wheel of the machine, said means being adapted to be overcome by the operator to release the lever so that the motor may fall into and be held in operative relation to the machine by its own weight unaffected by said means.

3. In a sewing machine provided with a driving wheel, the combination of a pivotally mounted motor adapted to be held in operative relation to the wheel by its own weight, a lever mounted adjacent to the motor and adapted at one end to engage the motor, and means for automatically actuating the lever to bring its end into engagement with the motor to lift the same out of operative relation to the wheel of the machine.

4. In a sewing machine provided with a driving wheel, the combination of a pivotally mounted motor adapted to be held in operative relation to the wheel by its own weight, a lever mounted adjacent to the motor and adapted at one end to engage the motor, and means for automatically actuating the lever to bring its end into engagement with the motor to lift the same out of operative relation to the wheel of the machine, said means being adapted to be overcome by the operator to release the lever so that the motor may fall into and be held in operative relation to the machine by its own weight unaffected by said means.

5. In a sewing machine provided with a driving wheel, the combination of a pivotally mounted motor adapted to be held in operative relation to the wheel by its own weight, a lever mounted to swing about a pivot coinciding with the pivot of the motor and formed at one end to engage the motor, and means for actuating the lever to bring its end into engagement with the motor to lift the same out of operative relation to the wheel of the machine.

6. In a sewing machine provided with a hand wheel and a belt pulley and mounted upon a table having holes therein for the passage of a driving belt, the combination of a pivotally mounted motor adapted to be held in operative relation to the wheel and pulley by its own weight, a lever mounted adjacent the motor and formed at one end to engage the motor, a member connected to the other end of the lever and passing through a belt hole in the table, and means for actuating the member to swing the lever into engagement with the motor to lift the same out of operative relation to the wheel of the machine.

In testimony whereof I affix my signature.

HYMAN MAIMIN.